L. A. KRAMER.
CARCASS DEHAIRING MACHINE.
APPLICATION FILED JAN. 19, 1920.

1,336,524.

Patented Apr. 13, 1920.
6 SHEETS—SHEET 1.

Witness:
Th. L. Tarrington

Inventor:
Louis A. Kramer
by Albert Scheible
Attorney

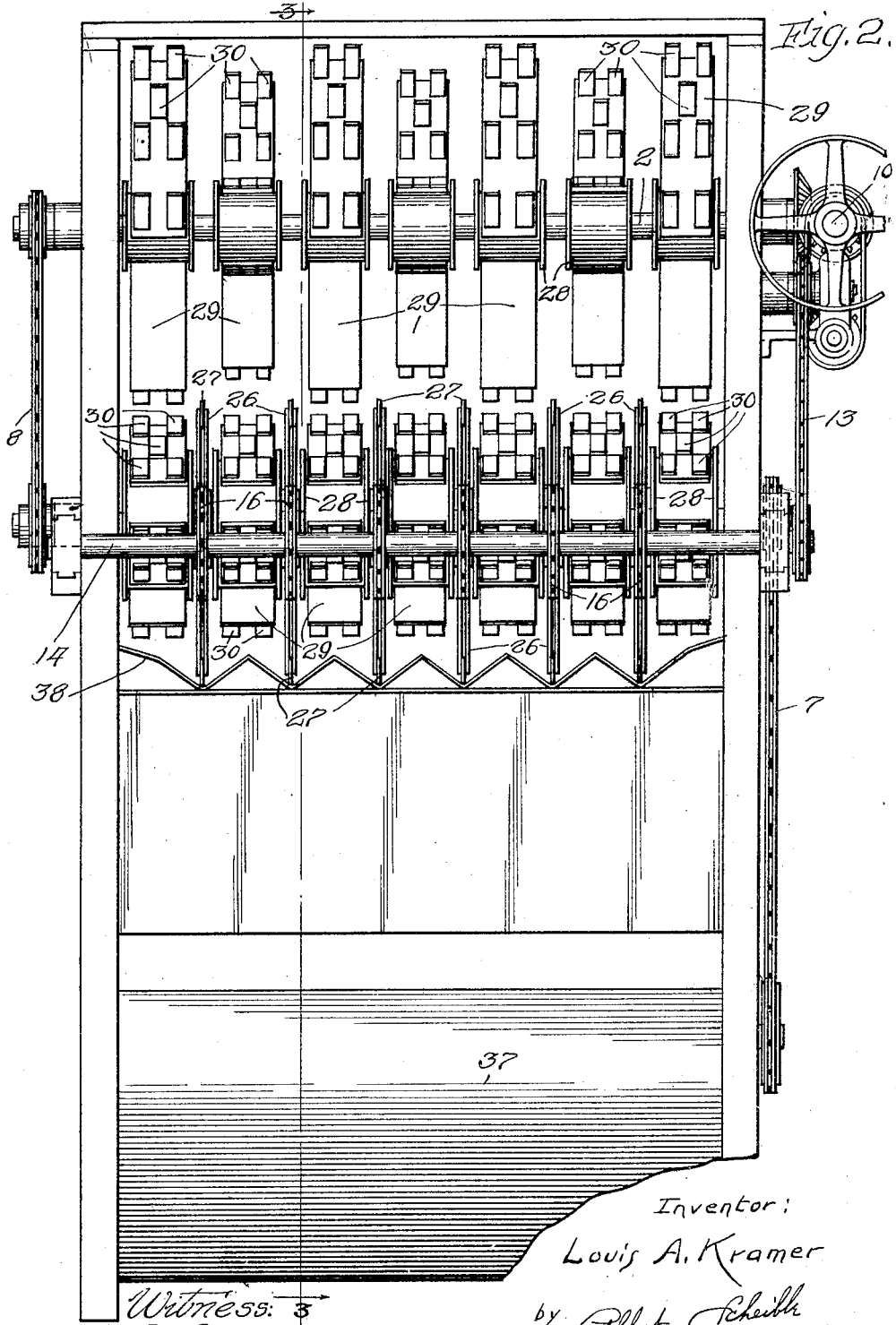

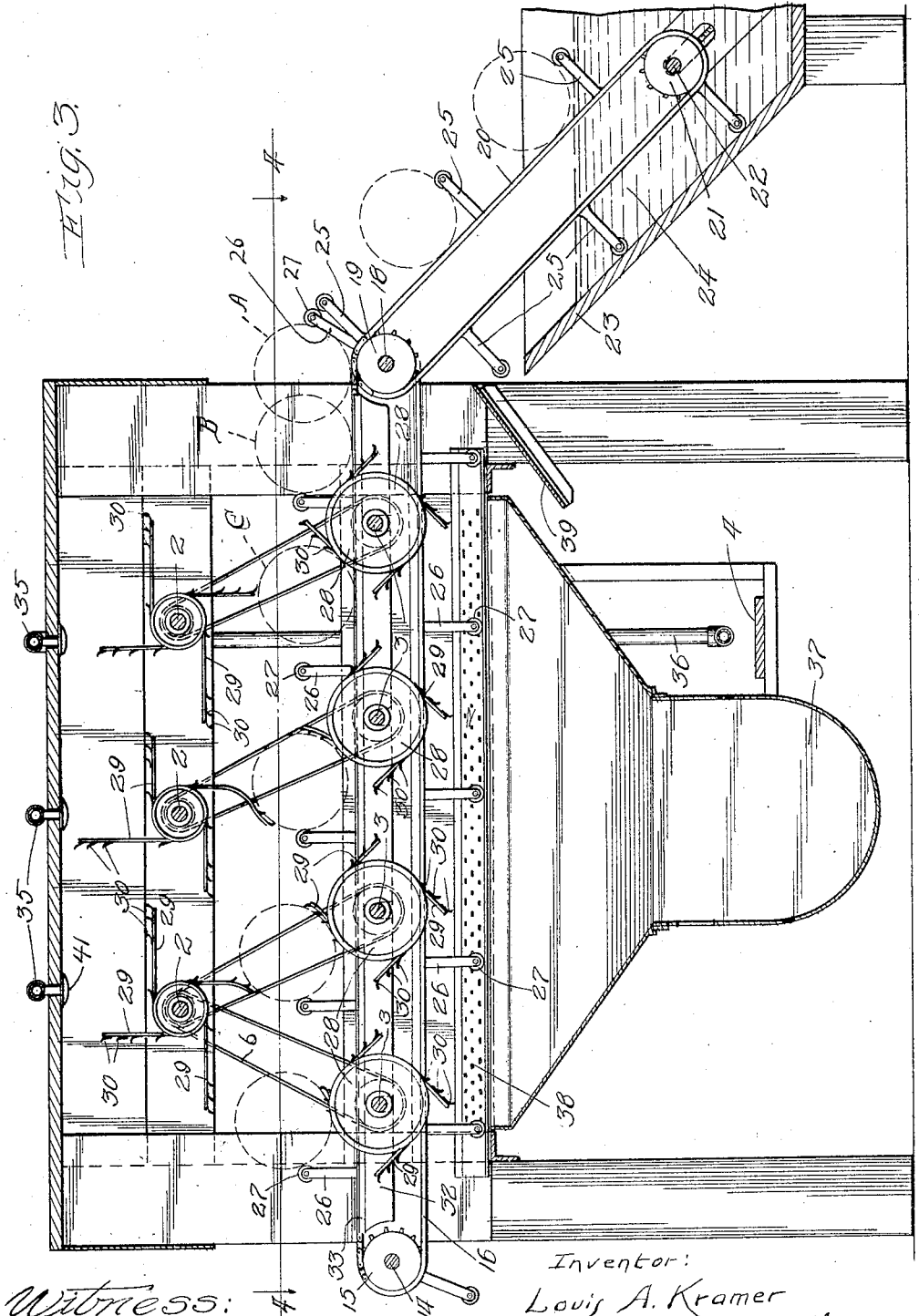

L. A. KRAMER.
CARCASS DEHAIRING MACHINE.
APPLICATION FILED JAN. 19, 1920.
1,336,524.
Patented Apr. 13, 1920.
6 SHEETS—SHEET 4.
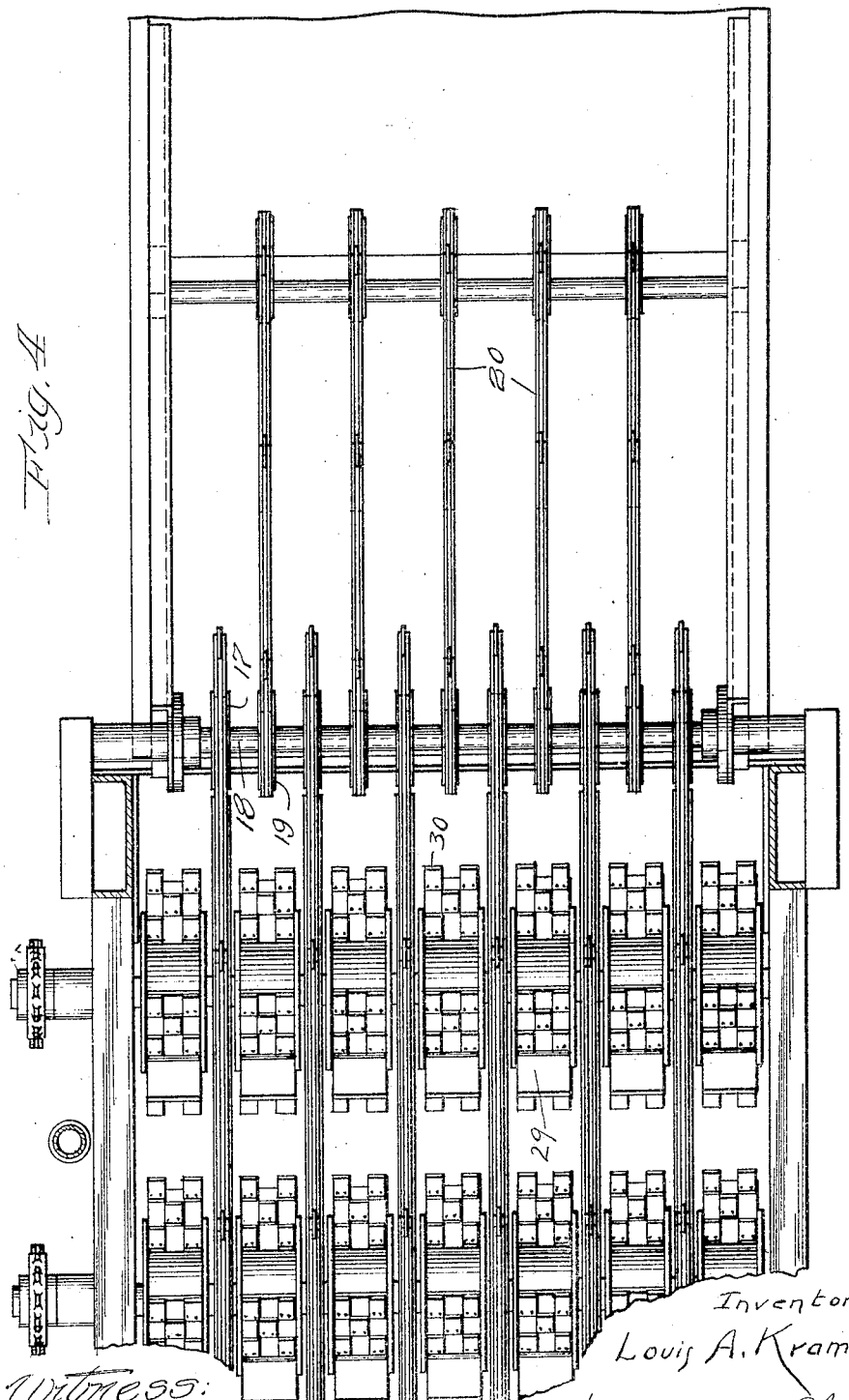
Inventor:
Louis A. Kramer
by Albert Scheibl

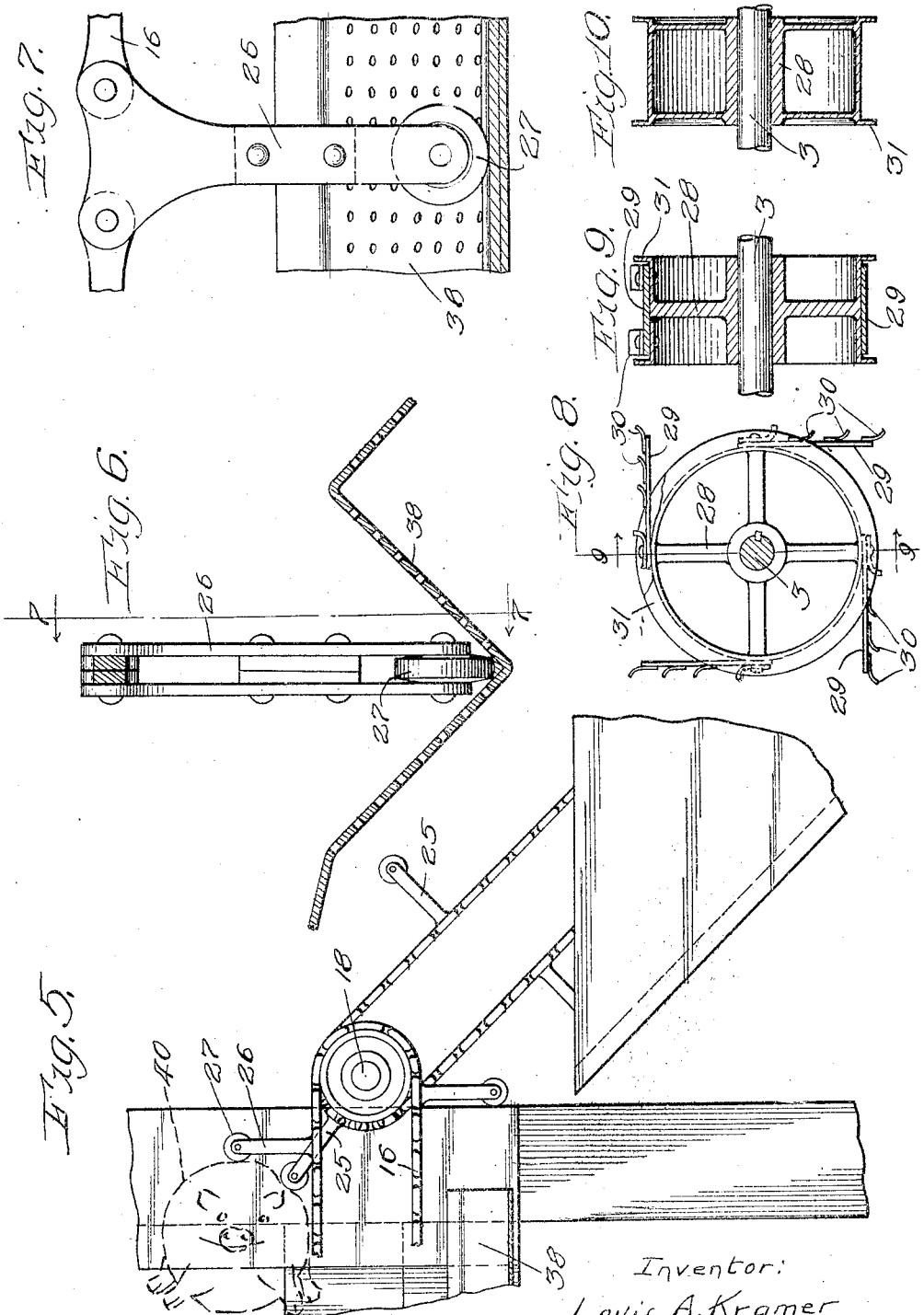

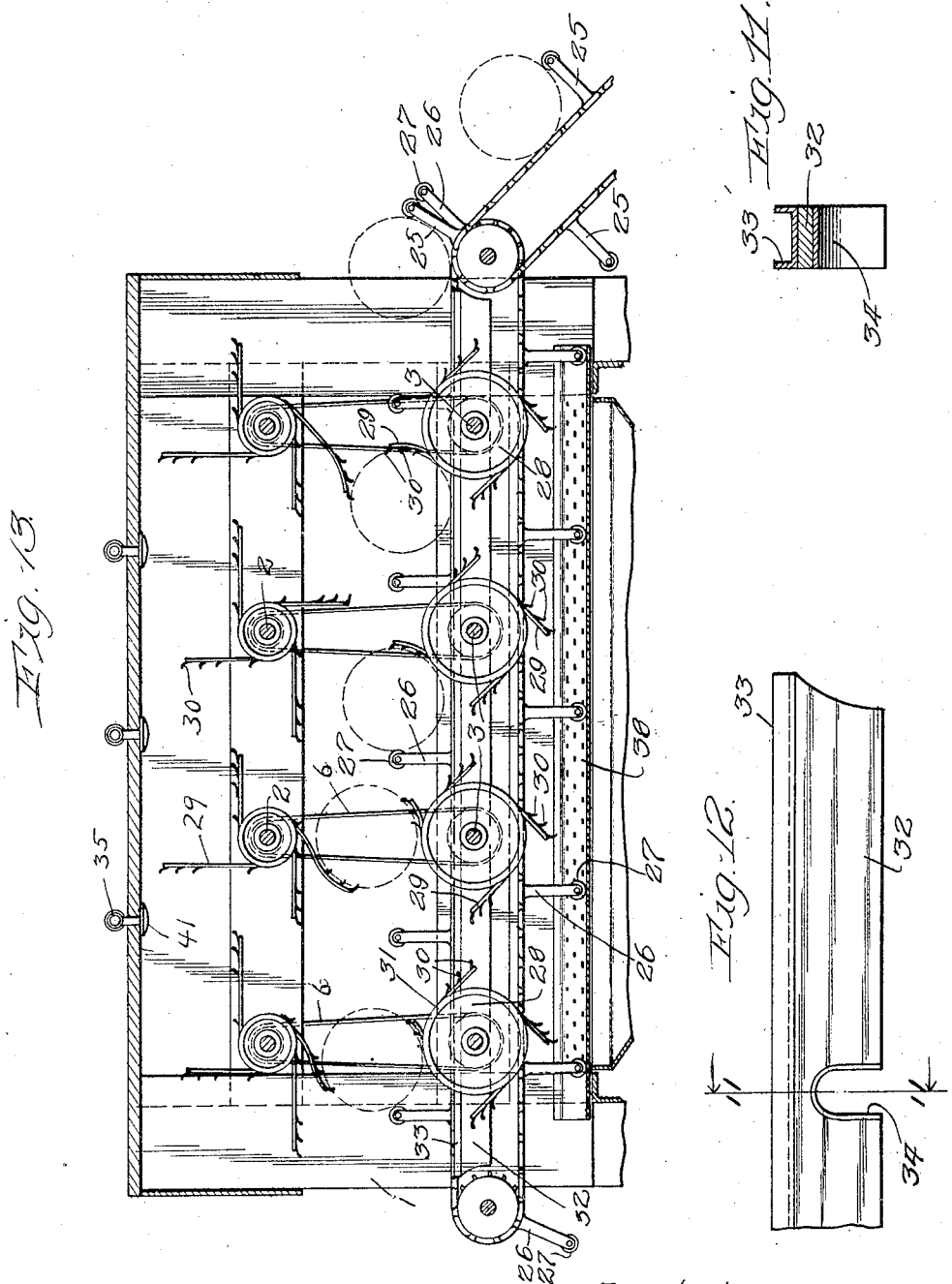

ed States, residing at
UNITED STATES PATENT OFFICE.

LOUIS A. KRAMER, OF CHICAGO, ILLINOIS.

CARCASS-DEHAIRING MACHINE.

1,336,524.  Specification of Letters Patent.  Patented Apr. 13, 1920.

Application filed January 19, 1920. Serial No. 352,501.

*To all whom it may concern:*

Be it known that I, LOUIS A. KRAMER, a citizen of the United States, residing at Chicago, in the county of Cook and State of Illinois, have invented certain new and useful Improvements in Carcass-Dehairing Machines; and I do hereby declare the following to be a full, clear, and exact description of the invention, such as will enable others skilled in the art to which it appertains to make and use the same.

My invention relates to machines for dehairing and cleaning carcasses and in some of its general objects aims to provide a machine which will be unusually effective for automatically cleaning substantially the entire surface portions of carcasses during a single pass through the machine, and which may be continuously operated for cleaning one after another of a series of carcasses without requiring any attention other than that of floating the carcasses near a portion of the receiving end of the machine. Machines for this general purpose have already been disclosed in U. S. Patent No. 1249776, issued to me Dec. 11, 1917 and U. S. Patent No. 1325893 issued to me Dec. 23, 1919, both of which patents show mechanisms for dehairing and rotating carcasses while the latter are being advanced through the machine. According to my present invention, I aim to provide a machine of this same general type which will be still more effective and advantageous in that it will increase the extent of the intermittent raising and lowering of the carcasses while providing means for preventing each carcass from being lifted or tossed over the spacers which divide the conveyer into longitudinally consecutive sections; to provide an arrangement in which the strains on the various groups of cleaning members will be distributed, so as to keep the power consumption of the machine as a whole substantially uniform and to avoid an overstraining of its parts; to arrange the groups of beaters so that each carcass may readily be acted upon simultaneously by two and even three such groups; to provide beater members of such length as to have a reach adequate even for carcasses of unusual sizes, while also arranging these beater members so as not to demand the spacing of the beater shafts which would ordinarily be required for beaters of such length; to provide a flexible beater arrangement in which the beater members will be effective both while relatively free, and while pressed against their support by the weight of the carcass, and in which the beating and scraping elements will operate positively in substantially all positions of contact with the carcasses for rotating the latter; to provide beater-supporting wheels which will both maintain the beaters in effective positions and act as friction rollers for aiding in rotating the carcasses, and to utilize the same wheels also as lateral guides for portions of the conveyer chain.

In another aspect, my invention aims to provide an improved conveyer arrangement for a machine of the general type of those shown in my said issued patents, and more particularly to provide a pair of synchronized conveyers, one of which will raise the carcass from the scalding tank while the other will convey it through the field of the dehairing operation of the machine and to provide effective means for transferring the carcasses from the initial or elevating conveyer to the main carcass-advancing conveyer; to provide simple and effective means for supporting and guiding the upper stretch of the main conveyer so as to reduce the strains on the shafts carrying the sprockets between which the main conveyer chains are stretched; to provide means auxiliary to the sprockets for supporting the lower stretch of the conveyer chain, and desirably to utilize the carcass-lifting rollers in this connection, and to arrange pairs of serially coöperating endless conveyer chains in such a manner that the push arms mounted on one will not interfere in action with those carried by the other.

In a further aspect, my invention aims to provide simple and effective means for rinsing the carcasses during their cleaning operation, for straining the hair, dirt and other solid refuse from the drip, and to provide effective means for removing such refuse from the strainer.

In a still further object, my invention aims to provide a combined dehairing and rotating member having both flexibly mounted and rigid portions adapted to rotate the carcasses, and desirably having these two kinds of portions disposed so as to alternate in effecting the desired rotation; to provide simple and effective means for laterally guiding and partially housing the flexible beating members, and to provide these beating members with scraper elements some of which will still be operative when the flexible beater portions are thus partially housed.

Still further and also more detailed objects will appear from the following specification and from the accompanying drawings, in which Figure 1 is a side elevation of a machine embodying my invention and having seven beater shafts, with a portion of the scalding tank broken away.

Fig. 2 is an end view of the same machine, taken from the delivery end of the same.

Fig. 3 is a vertical and longitudinal section taken along the correspondingly numbered line of Fig. 2.

Fig. 4 is an enlarged and fragmentary plan view of the receiving end portion of the machine, taken with the cover of the machine removed to disclose the operating mechanism.

Fig. 5 is an enlarged elevation showing the disposition of the push arms of the two conveyers after the inclined or elevating conveyer has delivered a carcass to the horizontal conveyer which advances the carcasses past the dehairing mechanisms.

Fig. 6 is an enlargement of portions of Fig. 2, showing the disposition of one of the thrust arms carried by the lower stretch of the horizontal conveyer, and of the portion of the screen which aids in supporting this stretch of the chain.

Fig. 7 is a view of the same parts taken from the correspondingly numbered line of Fig. 6.

Fig. 8 is a side elevation of one of the wheels which carry the flexible beaters with a portion of one flange broken away to show the arrangement of the scraper elements.

Fig. 9 is a vertical central section through Fig. 8, showing the flanges on this wheel which serve both for laterally guiding and protecting parts of the flexible beaters, for shielding the conveyer chains from contact with the flexible beaters, and for laterally guiding the conveyer chains.

Fig. 10 is a section similar to Fig. 9, showing a modified form of beater-carrying wheel in which the frame is supported by a pair of disks instead of the spokes of Fig. 8.

Fig. 11 is an enlarged vertical section through one of the guide beams which aid in supporting the upper stretches of the main conveyer chains, taken at right angles to Fig. 13 and in axial alinement with one of the shafts 3.

Fig. 12 is an enlarged elevation of an end portion of one of the same beams.

Fig. 13 is a fragmentary longitudinal section similar to Fig. 3, but showing an embodiment in which the upper beaters are mounted on shafts directly above the lower beaters and equal in number to the latter.

Figure 1:
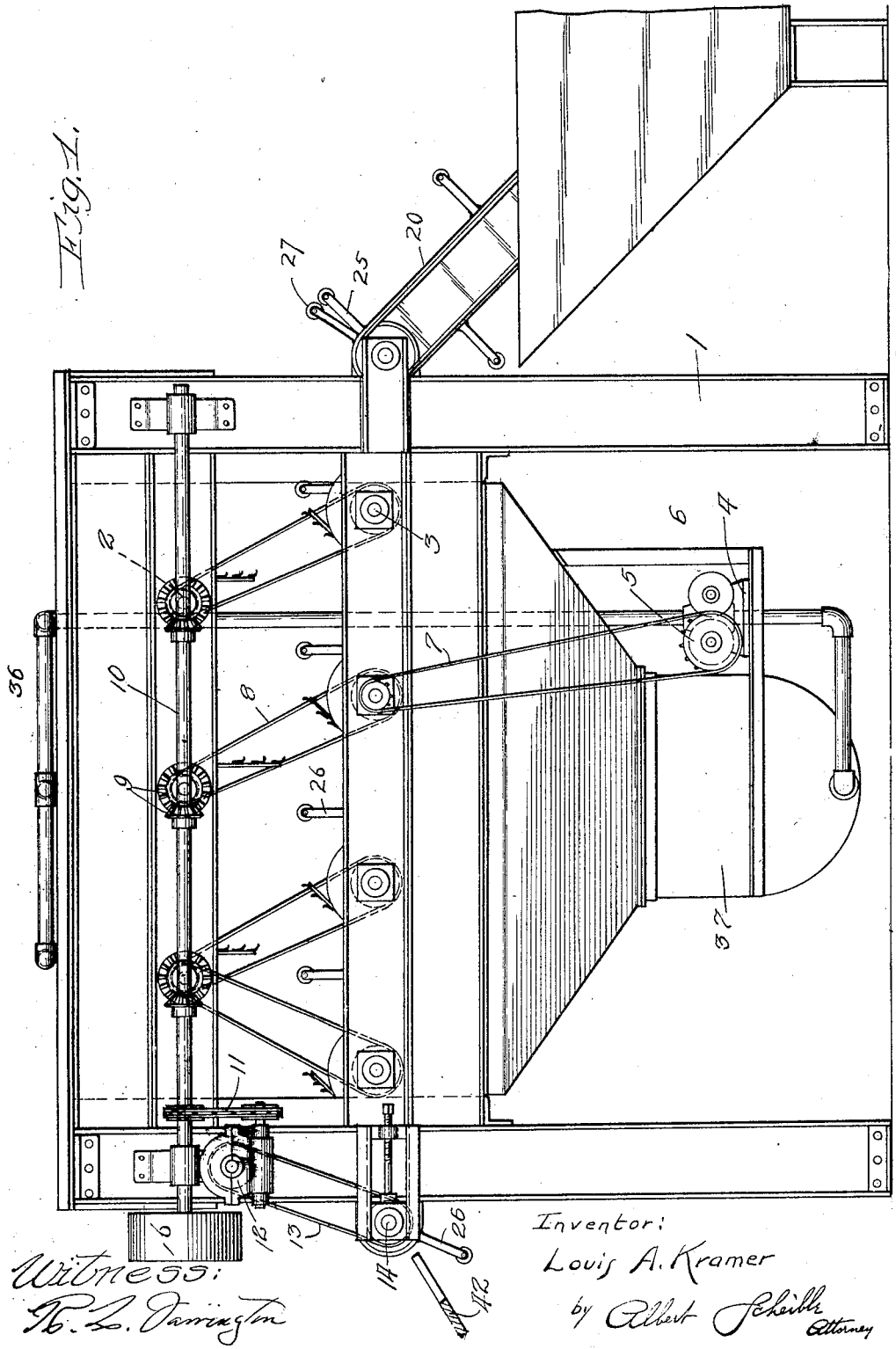

In many aspects, the illustrated embodiment of my machine includes features heretofore disclosed in the two U. S. Patents which I have previously mentioned. In these issued patents I have illustrated and described carcass dehairing machines in which each carcass is taken by a power-driven conveyer from a scalding tank and is freely supported while it is advanced at a generally predetermined rate of speed past a plurality of mechanisms arranged for dehairing and cleaning the carcass and for rotating the latter to cause it to be more effectively acted upon. In my present invention, I follow this same general course of procedure, but employ novel means for conveying the carcasses, for more effectively lifting and rotating the carcasses, for preventing the increased lifting from unduly shifting the carcasses in position, for supporting the conveyer chains, for straining hair and the like from the drip, for removing such hair and other deposits from the strainer, for combining an unusual reach of the flexible beater arms with a relatively close spacing of the beater shafts, and for accomplishing other purposes as hereafter described.

In the embodiment of the drawings, the machine of my invention includes a frame 1 carrying bearings for a series of beater shafts, namely three upper shafts 2 and four lower shafts 3. The frame 1 also carries a platform 4 supporting a pump connected by suitable means (including belts 7 and 8, and gears 9) with the main drive shaft 10 of the machine, which shaft receives its power from a pulley 5. This drive shaft is operatively connected to all of the beater shafts 2 and 3, and is also connected through a link belt 11 and a worm transmission 12 to a belt 13 which rotates a sprocket shaft 14. Fast upon this shaft and spaced longitudinally along the latter are sprockets 15, each of which is intermeshed with an endless conveyer chain 16 extending longitudinally of the machine in the form of an elongated loop encircling the lower beater shafts 3. Each of these endless chains is intermeshed at its other end with a companion sprocket 17 fast upon a juncture shaft 18. This latter shaft also has fastened to it drive sprockets 19 disposed respectively between the consecutive sprockets 17 and intermeshed with a corresponding number of inclined conveyer chains 20 stretched between the said sprockets 19 and idler sprockets 21, the latter being on a shaft 22 which is disposed horizontally within a scalding tank 23 below the level of the liquid 24 in the latter. Each of the said endless conveyer chains carries a series of projecting fingers or push arms, and these arms are all uniformly spaced along the chains, with the arms on each group of chains (namely the horizontal or main conveyer chain group and the inclined or elevating conveyer chain group) alined transversely of the chains. Moreover, all of these arms desirably have revoluble tip formations, such as rollers 27, which aid in the transfer of the carcass from one conveyer to the other, facilitate the rotating of the carcasses during the dehairing operation, and also prevent each carcass from being moved out of its prescribed section of the horizontal conveyer, as hereafter more fully described.

While the rotating dehairing mechanisms mounted on the various beater shafts may be of different types, I desirably employ a construction in which each beater member includes a wheel 28 having a plurality of flexible beaters 29 secured to it, each of which flexible beaters carries a series of metal scraper elements 30. The wheel 28 desirably has at its opposite sides a pair of projecting flanges 31, which flanges are adapted to act as lateral guides for the flexible beater members 29, so as to prevent an undue lateral twisting of these beater members, thereby preventing the latter from contacting with the conveyer chains or other parts of the mechanism. Moreover, the wheels 28 are desirably considerably larger in radius than the distance between the top of the upper stretch of the horizontal or main conveyer chains and the axes of the lower beater shafts 3, so that these wheels continuously project between the said chains 16 for a considerable distance above the tops of these chains or into the path traversed by the carcasses.

To maintain the extent of this projection substantially uniform and to prevent the conveyer chains from being pressed against the beater shafts 3 by the weight of the carcasses, I desirably provide means for slidably supporting the upper stretches of the conveyer chains 16, thereby also reducing the strain on the shafts 14 and 18 carrying the sprockets between which these chains are stretched. For this purpose I desirably employ members disposed respectively between the shafts 3 and the upper stretches of the chain 16 and affording guideways on which the upper stretches of the chains can slide. For example, in the drawings I am showing for this purpose a wooden beam 32 supported jointly by the shafts 3 and carrying a channel 33 which forms the guideway for the chain 16, after the manner illustrated in Fig. 11. To prevent the beam 32 from sliding longitudinally, I desirably equip the same opposite each of the said shafts with a notch engaging the shaft, and desirably line each of the notched portions with a metal lining 34 to reduce the wear, as for example after the manner shown in Fig. 12.

To remove the hair, dirt and the like loosened from the carcasses by the dehairing and cleaning mechanisms I desirably provide continuous sprays of water from nozzles 41 disposed above the upper beater shafts, the water for this purpose being continuously supplied by the pump 5 through pipes 36 and 35 from a drip tank 37 into which the rinsing water drips from the carcasses and from the beater members. To strain the hair and other solid matter from this drip, I provide a suitable screen above the drip tank and for this purpose desirably use a trough 38 made of perforated metal and formed into a series of corrugations after the manner shown in Fig. 2, with the bottoms of the corrugations extending longitudinally of the machine in alinement respectively with the horizontal conveyer chains 16. These bottoms of the groups are desirably spaced from the lower stretches of the main conveyer chains by distances corresponding to the reach of the spacer fingers or push arms carried by these chains, so that the roller 27 carried by each of these arms 26 will engage the bottom of one of the said corrugations, as shown in Fig. 6, thereby providing a wheeled support for the lower stretch of the conveyer and correspondingly reducing both the strains on the shafts 14 and 18 and the friction on the latter. While thus aiding in supporting the conveyer chains, the downwardly projecting arms 26 and the rollers mounted thereon will also engage hair or other refuse deposited on the screen 38 and will slide such refuse off the screen at the receiving end of the machine, where it falls upon an inclined chute 39 (shown in Fig. 3) which discharges it to some suitable receptacle not shown in the drawings.

Since the sprockets 17 and 19 on the juncture shaft 18 are all fast upon this shaft, the two series of conveyer chains will move in unison when the sprocket shaft 14 is driven by power as heretofore described, and since the push arms on both sets of chains are uniformly spaced and the arms on each set are alined with each other in rows extending transversely of the machine, there will be a predetermined relation between the movement of these arms about the juncture shaft 18, consequently, the arms on the two conveyers can readily be so timed that they all aline with others shortly before the carcass-advancing arms 26 reach their initial vertical positions. Then as the movement of the chain continues, the horizontal chains will maintain the arms 26 vertical, while the inclined conveyer chains will carry their arms 25 through arcs concentric of the shaft 18. In doing so, the adjacent arms on the two sets of chains move from the position of Fig. 3 to that of Fig. 5. Consequently, the arms 26 on the horizontal conveyer will move the carcass 40 out of the way of the arms 25 on the elevating conveyer chains after the manner of Fig. 5, and in some cases the rollers on both sets of arms may engage the carcass simultaneously (as shown in the same figure) consequently, the arms on the two chains will not interfere with each other after transferring the carcass from the auxiliary or elevating conveyer to the horizontal carcass advancing conveyer, and the rollers on them will assist in the transferring.

In operating the machine above described, both the beater shafts and the conveyers are continuously driven, as I aim to accomplish the desired results by a continuous motion which enables me to attain these results more expeditiously, with less expenditure of power, with lower initial cost and with reduced cost of attendance as compared with machines employing intermittent movements of the carcass. Each carcass which is to be cleaned is first immersed in the liquid within the scalding tank 23 in the usual manner and the carcasses are successively floated up against the inclined conveyer or elevator 20, this being the only manual attention required by the machine. When a carcass is thus close to the auxiliary or elevating conveyer, the arms 25 on the latter engage the carcass and coöperate with the chains 20 in raising the carcass to a level corresponding to the top of the upper stretches of the horizontal conveyer chains 16. As the carcass approaches the juncture shaft 18, a group of the arms 26 on the main conveyer swings behind the carcass about the axis of the said shaft, and the arms 25 which have been supporting the carcass on the elevating conveyer aline momentarily with the arms 26 on the main conveyer while the carcass is being transferred from the former to the latter conveyer. The carcass is therefore delivered to the main or carcass-advancing conveyer in a position of the latter (such as the position A of Fig. 3) defined longitudinally by two rows of the spacer arms 26, between which rows of arms the carcass is free to roll back and forth. The rear row of these arms then push the carcass along at a speed predetermined by the rate at which the horizontal chains are driven, and hence determine the definite rate at which the carcass is moved through the machine and past the cleaning and dehairing mechanisms.

As soon as the carcass approaches the first of these dehairing mechanisms, the scrapers on the latter will tend simultaneously to dehair the carcass and to rotate the latter on the conveyer. This tendency increases as the carcass advances toward the first beater shaft, and when the carcass has been pushed to the position marked B in Fig. 3, it engages the flanges 31 on the beater-carrying wheels 28. Consequently, a further pushing of the carcass by the push arms behind it will roll the carcass up on these rims (which project continuously and considerably above the tops of the horizontal conveyer chains), and in doing so the rotation of these rims will rotate the carcass by frictional engagement with the same. Moreover, the push arms are desirably of such a height that the engagement of the carcass with the same is transferred entirely to the rollers 27 when the carcass is thus lifted off the main conveyer chains, even though a relatively small or flabby carcass might have been contacting directly with the main or rigid arm portions 26 before the carcass was lifted. The rollers 27 will therefore form revoluble or anti-friction bearings to facilitate the rotating of the carcass by the cleaning members. With the dehairing members arranged as here illustrated, this rotation will therefore be effected alternately by the friction of the rim portions 31 against the carcass, and by the engagement of the carcass by the scrapers on the flexible arms, I am able in this manner to secure a positive and substantially continuous rotating of the carcass, thereby effectively presenting the various surface portions of the carcass to dehairing and cleaning elements reaching the carcass from various directions. To make this action all the more effective, I desirably space the consecutive beater shafts relatively close to one another and suitably proportion the spacing of the consecutive push arms on the main conveyer, so as to cause the carcass to be engaged by the beaters on each single shaft while the carcass is being advanced for a considerable distance through the machine. Thus, it will be seen from Fig. 3 that the spacer or push arms 26 are consecutively spaced by distances less than the spacing between the consecutive shafts 3, and that a carcass would be reached by the beaters in positions both earlier and later than the position marked B and C.

To increase the extent to which the beaters will follow the travel of the carcass and the effectiveness with which they will reach the carcass both while advancing toward the beater shaft and while receding from the latter, I desirably also include in the beater equipment flexible arms of considerable length. Such desirable lengths if employed on beater portions carried respectively by consecutive shafts and alined longitudinally of the machine would require a spacing between the beater shafts which would increase the needed floor space and would reduce the operating capacity of the machine. I therefore desirably equip each beater shaft with flexible beaters which are alternately longer and shorter in effective reach than a point midway between two consecutive shafts (as shown in Fig. 2) and I then alternate such long and short beaters on the consecutive shaft portions which aline with each other longitudinally of the machine, after the general manner shown in Fig. 13.

To increase the capacity of my machine still further in proportion to the floor space occupied by the same and to the initial cost, I may also provide a second series of dehairing members carried by beater shafts 2 disposed above the path through which the carcasses are conveyed. These upper shafts are desirably positioned in vertical planes midway between the horizontal shafts, so as to reach each carcass most effectively while the latter is midway between the lower dehairing mechanisms, or at a point where it is not raised off the conveyer chains and where it will therefore offer a considerable resistance to the rotational tendency imparted simultaneously in the same direction by the beater members on three shafts, namely two lower shafts and one upper one. On the upper shaft, the flexible beater members also are desirably mounted on wheels arranged after the manner of Figs. 8 to 10 inclusive, so as to afford means for laterally guiding and protecting the flexible arm portions, but these wheels may be considerably smaller in diameter than those employed on the lower shafts, as the wheels themselves do not function in engaging the carcass to lift and rotate the latter and do not require flanges for guiding chains.

By suitably proportioning the driving connections so that the extent of engagement of the carcass by the dehairing mechanism will be ample for effecting the desired cleaning, I can readily dehair and otherwise clean substantially the entire surface portions of a carcass during a single pass through the machine, so that the carcass will be cleaned when discharged at the rear of the machine upon inclined slats 42 leading to a delivery table, these slats being suitably spaced to permit the arms 26 to pass between them. To insure an effective action of the dehairing members, I desirably make the scraper elements 30 of such a size that they will project somewhat beyond the rims 31 of the wheels carrying the beater members even when the latter are flexed down into the grooved rim as shown in dotted lines in Fig. 8. Consequently, while the flanges 31 laterally guide the flexible arms 29, particularly when unusual pressure is exerted by the weight of a heavy carcass, this bending back of the beater arm will still leave the scraper elements operatively disposed and able to exert an effective scraping action. Moreover, I desirably mount at least one of the scraper elements associated with each flexible beater right at the connection of the latter with the wheel carrying the same, as shown at the top of Fig. 8, this element being also of such a height as to project radially of the wheel beyond the flanges 31.

However, while I have illustrated and described my invention in a desirable embodiment including a combination of various novel features and have disclosed certain desirable arrangements of these, I do not wish to be limited to the embodiment thus disclosed, it being obvious that the construction and arrangement might be modified in many ways without departing from the spirit of my invention. For example, instead of mounting the upper and lower beater shafts in positions staggered longitudinally of the machine, the upper and lower beater shafts might be equal in number and arranged in vertically alined pairs, as shown in Fig. 13. Neither do I wish to be limited to the use of all of the features thus disclosed in combination with one another, it being obvious that the same might be employed advantageously and with substantially their same effect in other combinations.

I claim as my invention:

1. In a carcass cleaning machine, carcass advancing means including push members having revoluble portions.

2. In a carcass cleaning machine, carcass advancing means including push members having revoluble portions disposed for forming the entire thrust engagement when the carcass is raised from its normal support.

3. In a carcass cleaning machine, a conveyer, for advancing loosely supported carcasses, means acting upwardly through the conveyer for intermittently lifting the carcasses, spacers on the conveyer for limiting the movement of each carcass on the conveyer longitudinally of the latter, and means associated with the spacers for preventing the lifting of carcasses over the same by the operation of the said lifting means.

4. In a carcass cleaning machine, a conveyer supporting the carcass while in the field of the dehairing operation, push arms for advancing the carcass through the said field while thus supported, means for intermittently raising the carcass off the conveyer during its said advancing, and revoluble elements carried respectively by the push arms substantially at the upper ends of the latter.

5. In a carcass cleaning machine, a conveyer for supporting and advancing the carcasses, dehairing means operating through the conveyer and adapted to raise the carcass intermittently, and anti-friction means associated with the conveyer and laterally engaging the carcasses primarily while the latter are raised.

6. In a carcass cleaning machine, a main conveyer for advancing carcasses while they are being cleaned, an auxiliary conveyer inclined with respect to the main conveyer and arranged for delivering carcasses to the latter, and uniformly spaced push arms on both conveyers, the arms on the main conveyer being timed for substantially alining transversely of the conveyers with those of the auxiliary conveyer at a certain part of the path traversed by the carcasses.

7. In a carcass cleaning machine, a main conveyer for advancing carcasses while they are being cleaned, an auxiliary conveyer inclined with respect to the main conveyer and arranged for delivering carcasses to the latter, and uniformly spaced push arms on both conveyers, the arms on the main conveyer being timed for substantially coinciding with those of the auxiliary conveyer at a certain part of the path traversed by the carcasses and for then pushing the carcasses out of the way of the arms on the auxiliary conveyer.

8. In a carcass cleaning machine, a main conveyer for advancing carcasses through the field of the cleaning operation, and an auxiliary conveyer for delivering carcasses to the main conveyer, each of the conveyers including a plurality of parallel endless members carrying uniformly spaced push arms disposed in rows alined transversely of the conveyers, the auxiliary conveyer being inclined with respect to the main conveyer, and the endless members of both conveyers being trained at one end of each over coaxial sprockets.

9. In a carcass cleaning machine, a rotating dehairing mechanism, a conveyer for advancing the carcass past the dehairing mechanism, means for intermittently raising the carcass off the conveyer, spacers upon the conveyer dividing the latter transversely into divisions for limiting the movement of each carcass on the conveyer longitudinally of the latter, and anti-friction means associated with the spacers for preventing carcasses from being rolled over the spacers from one of the said divisions into another.

10. In a carcass cleaning machine, a conveyer supporting the carcass while in the field of the dehairing operation, push arms for advancing the carcass through the said field while thus supported, means for intermittently raising the carcass off the conveyer during its said advancing, and revoluble elements carried respectively by the push arms, the said elements being so disposed that the pushing thrust is transferred thereto from the arms proper when the carcass is raised off the conveyer.

11. In a carcass cleaning machine, a conveyer for supporting and advancing the carcasses through the field of the dehairing operation, a refuse catching trough under the conveyer, and carcass pushing arms carried by the conveyer and disposed for moving refuse along the trough.

12. In a carcass cleaning machine, an endless conveyer for the carcasses, a trough under the conveyer, and spaced arms carried by the conveyer; the said arms projecting upwardly on the upper stretch of the conveyer and engaging the carcasses to advance the latter, and depending downwardly into the trough from the lower stretch of the conveyer.

13. In a carcass cleaning machine, an endless conveyer having an upper stretch arranged for supporting and advancing the carcasses, a refuse catching trough below the conveyer, and means carried by the conveyer and extending into the trough from the lower stretch of the conveyer for moving refuse along the trough.

14. In a carcass cleaning machine, an endless conveyer having an upper stretch arranged for supporting and advancing the carcasses, a refuse catching trough disposed below the conveyer and having a plurality of longitudinal grooves, and means on the conveyer extending from the lower stretch of the latter respectively into the said grooves for removing refuse from the trough.

15. In a carcass cleaning machine, a conveyer for supporting and advancing the carcass through the field of the cleaning operation, means for spraying liquid upon a carcass during the dehairing operation, a drip catching tank below the conveyer, carcass pushing means carried by the conveyer, and a screen disposed between the conveyer and the tank for straining hair and the like from the drip, the carcass pushing means being also disposed for pushing hair and the like off the screen.

16. A carcass cleaning machine as per claim 15, in which the screen is disposed for engaging the carcass pushing arms and thereby supporting the lower stretch of the conveyer while the arms are pushing refuse off the screen.

17. In a carcass cleaning machine, means for advancing a carcass through a given path transversely of the carcass, dehairing means disposed for engaging the carcass while thus advancing, means other than the dehairing means for rotating the carcass intermittently while thus advancing, and revoluble means associated with the advancing means and disposed for coöperating with the rotating means in facilitating the rotating of the carcass.

18. In a carcass cleaning machine, means for supporting and advancing the carcasses in substantially a rectilinear path, groups of dehairing means disposed respectively above and below the aforesaid means, the lower dehairing means being adapted to raise the carcasses when passing the same and the upper dehairing means being vertically out of alinement with the lower dehairing means.

19. In a carcass cleaning machine, means for supporting and advancing the carcasses in substantially a rectilinear path, groups of dehairing means disposed respectively above and below the aforesaid means, the upper and lower dehairing means being in relatively staggered relation to each other.

20. In a carcass cleaning machine, a plurality of parallel beater shafts, and a plurality of beaters on each shaft, the beaters on the adjacent shafts being respectively in alinement with each other and the alining beaters on adjacent shafts being of different lengths.

21. In a carcass cleaning machine, a plurality of parallel beater shafts, and a group of flexible beaters mounted on each shaft, the beaters of each group including beaters respectively longer and shorter in effective reach than half the spacing between the adjacent beater shafts, the long beaters carried by one shaft being in alinement transversely of the shafts with short beaters on the next shaft.

22. In a carcass cleaning machine, a plurality of parallel shafts carrying dehairing mechanisms, an endless conveyer encircling the said shafts and having its upper stretch disposed for supporting and advancing the carcass through the machine, and means carried by the shafts for assisting in supporting the said upper stretch of the conveyer.

23. Mechanism as per claim 22, in which the said means include a beam extending transversely of the shafts between the shafts and the upper stretch of the conveyer and having its upper surface slidably engaged by the said upper stretch.

24. Mechanism as per claim 22, in which the said means include a beam extending transversely of the shafts between the shafts and the upper stretch of the conveyer and having its upper surface slidably engaged by the said upper stretch, the lower edge of the said beam being equipped with notches respectively entered by the said shafts.

25. In a carcass cleaning machine, a carcass-advancing conveyer divided into longitudinal sections each limiting the movement of a single carcass while in the field of the cleaning operation, and a correspondingly sectioned auxiliary conveyer arranged for feeding carcasses successively into the said conveyer sections.

26. In a carcass cleaning machine, a carcass-advancing conveyer divided into longitudinal sections each limiting the movement of a single carcass while in the field of the cleaning operation, and a correspondingly sectioned auxiliary conveyer arranged for lifting carcasses successively out of a scalding tank and feeding them successively into the said conveyer sections.

27. In a carcass cleaning machine, means for conveying a carcass through the machine along a substantially predetermined path, means spaced longitudinally of the said path for lifting the carcass, dehairing means operating from beneath the said path and spaced to coöperate respectively with the lifting means in lifting the carcass, and other dehairing means operating from above the carcass and spaced along the said path at points respectively intermediate the consecutive lifting means.

Signed at Chicago, January 17th, 1920.

LOUIS A. KRAMER.